United States Patent
Dierking et al.

(10) Patent No.: US 8,372,464 B2
(45) Date of Patent: Feb. 12, 2013

(54) METHODS FOR PRODUCING PARTIALLY HYDRATED AND COOKED BEAN PRODUCTS

(75) Inventors: Mark Dierking, Omaha, NE (US); Richard Schumacher, Blair, NE (US); Jerry Hopkins, Omaha, NE (US)

(73) Assignee: ConAgra Foods RDM, Inc.

( * ) Notice: Subject to any disclaimer, the term of this patent is extended or adjusted under 35 U.S.C. 154(b) by 226 days.

(21) Appl. No.: 12/530,733

(22) PCT Filed: Mar. 12, 2008

(86) PCT No.: PCT/US2008/056658
§ 371 (c)(1),
(2), (4) Date: Sep. 10, 2009

(87) PCT Pub. No.: WO2008/112761
PCT Pub. Date: Sep. 18, 2008

(65) Prior Publication Data
US 2010/0104720 A1  Apr. 29, 2010

Related U.S. Application Data

(60) Provisional application No. 60/906,437, filed on Mar. 12, 2007.

(51) Int. Cl.
*A23L 1/20* (2006.01)
(52) U.S. Cl. .......... 426/516; 426/460; 426/461
(58) Field of Classification Search ......... 426/516, 426/448, 460, 634; 366/82, 88–89; 99/348; 425/200, 205, 207
See application file for complete search history.

(56) References Cited

U.S. PATENT DOCUMENTS

| | | | |
|---|---|---|---|
| 4,735,816 A | | 4/1988 | Sterner |
| 4,748,037 A | * | 5/1988 | Matsumoto et al. .......... 426/448 |
| 4,871,567 A | | 10/1989 | Sterner et al. |
| 5,151,285 A | | 9/1992 | Williams et al. |
| 5,213,831 A | | 5/1993 | Leggott et al. |
| 5,296,253 A | | 3/1994 | Lusas et al. |
| 5,694,833 A | * | 12/1997 | Wenger ......................... 99/348 |
| 5,725,902 A | | 3/1998 | Lesueur-Brymer et al. |
| 6,016,742 A | | 1/2000 | Hauck et al. .................... 99/348 |
| 6,220,150 B1 | | 4/2001 | Margolis |
| 6,482,457 B1 | | 11/2002 | Margolis |
| 6,602,539 B2 | | 8/2003 | Stubbs et al. |
| 7,074,444 B2 | | 7/2006 | Margolis |
| 2002/0187242 A1 | | 12/2002 | Stubbs |
| 2006/0051492 A1 | * | 3/2006 | Mueller et al. ................ 426/656 |

FOREIGN PATENT DOCUMENTS

WO  WO 97/17858  5/1997

* cited by examiner

*Primary Examiner* — Steven Leff
(74) *Attorney, Agent, or Firm* — Ryan T. Grace; Advent (57) ABSTRACT

Methods for producing a partially hydrated bean paste are disclosed. The methods include inputting a quantity of uncooked whole beans or split beans into an extruder comprising an inlet, one or more temperature zones in series downstream of the inlet, and a die downstream of the one or more temperature zones; rotating a screw assembly of the extruder to extrude the beans and force the beans through the one or more temperature zones, wherein a quantity of steam and a quantity of water is added to the beans as the beans are forced through each temperature zone; and forcing the beans exiting the final temperature zone of said one or more temperature zones in series through the die to produce a bean paste. The partially hydrated bean paste produced by the methods of the disclosure comprises a water content of at least about 45% by weight. The partially hydrated bean paste can be further processed into partially hydrated bean products, such as refried beans.

26 Claims, 9 Drawing Sheets

METHODS FOR PRODUCING PARTIALLY HYDRATED AND COOKED BEAN PRODUCTS

CROSS REFERENCE TO RELATED APPLICATIONS

This application is being filed on 11 Sep. 2009, as a National Stage of PCT International Patent application No. PCT/US2008/056658, filed 12 Mar. 2008 in the name of ConAgra Foods RDM, Inc., a U.S. national corporation, applicant for the designation of all countries except the U.S., and Mark DIERKING, a citizen of the U.S., Richard SCHUMACHER, a citizen of the U.S., and Jerry HOPKINS, a citizen of the U.S., applicants for the designation of the U.S. only, and claims priority to U.S. Provisional Patent Application Ser. No. 60/906,437 filed on 12 Mar. 2007. To the extent appropriate, a claim of priority is made to each of the above disclosed applications.

TECHNICAL FIELD

The disclosure generally relates to the field of bean processing, and more particularly to methods for producing partially hydrated bean products, such as a partially hydrated refried bean product.

BACKGROUND

Typically cooking and processing for producing fresh refried bean products are long and laborious. Therefore, instant/dried refried bean products, which may be processed and cooked quickly, are particularly appealing for the restaurant industry creating high demand for instant/dried refried beans. Instant/dried refried bean products are cooked, dehydrated refried beans that have longer shelf lives than hydrated refried beans and form instantly upon the addition of water with little or no cooking time required prior to consumption.

This demand led to the advancement of extrusion technology, which shortened the long processing time of creating instant/dried refried beans. Extrusion has become a popular method of cooking and extruding for several foods. Extruders were created and perfected to dry refried beans for the creation of instant/dried refried beans. These extruders are capable of extruding and may also be capable of dehydrating, and/or cooking beans to form bean dough for utilization in the creation of instant/dried refried bean products. Bean dough is extruded, dehydrated beans that have a water content of about 10% to about 30% by weight. The inclusion of all of these processes (hydrating, cooking, and extruding) in one machine reduces labor and quickens processing times to make the production of instant/dried refried beans more efficient.

Several other refried bean products exist besides instant/dried refried beans. These other bean products are at least partially hydrated and may be fully hydrated and include products such as canned refried beans, frozen refried beans, aseptic refried beans, and refried beans processed and cooked for immediate consumption. Canned and/or frozen refried bean products are also utilized as a time-saving alternative to the cooking of refried beans from scratch. Moreover, these products have increased shelf-lives as well. The convenient canned and frozen refried beans are utilized by individual consumers and the restaurant industry making these forms of refried beans also in demand. Moreover, consumers and some restaurants may desire large quantities of refried beans that are ready for consumption directly after processing without storage time and preservatives for a more natural taste.

The processing and cooking of partially hydrated bean products, such as partially hydrated refried bean products, is also long and laborious. Therefore, it would be desirable to provide a method and/or system for decreasing the processing time and labor needed to produce a partially hydrated bean product, such as partially hydrated refried beans. It would also be desirable to provide a method for producing a partially hydrated refried bean product that is faster and easier than current manual processing methods.

SUMMARY

The disclosure relates to a method for producing a partially hydrated and cooked bean product. The hydrated and cooked bean product can be a partially hydrated refried bean product.

The methods for producing a partially hydrated and cooked bean product comprise inputting a quantity of uncooked whole beans or split beans into an extruder. The extruder comprises an inlet, one or more temperature zones in series downstream of the inlet, and a die downstream of the one or more temperature zones. The beans are extruded and cooked by rotating a screw assembly of the extruder and forcing the beans through the one or more temperature zones wherein a quantity of steam and a quantity of water is added to the beans as the beans are forced through each temperature zone. The beans are extruded, cooked, and hydrated as they are forced through the one of more temperature zones of the extruder. The beans exiting the extruder are cooked and generally in a paste form and are forced through a die to produce a bean paste. The bean paste produced by the methods of the disclosure comprises at least 45% water by weight. The bean paste can be further processed into partially hydrated bean products, such as refried beans, ready for consumption refried beans, aseptic refried beans, or frozen refried beans.

It is to be understood that both the foregoing general description and the following detailed description are exemplary and explanatory only and are not necessarily restrictive of the disclosure. The accompanying drawings, which are incorporated in and constitute a part of the specification, illustrate examples and together with the general description, serve to explain.

BRIEF DESCRIPTION OF THE DRAWINGS

The numerous advantages may be better understood by those skilled in the art by reference to the accompanying figures in which.

DETAILED DESCRIPTION

Typically to process beans for refried bean products and the like, a series of time consuming steps must be accomplished. Initially, the beans can be washed and any undesirable materials, such as stones are removed. The beans can be sorted and any undesirable beans are removed. Next, the beans can be pre-cooked and/or hydrated and tempered for up to 48 hours. Tempering assures that the beans will hydrate evenly. This can be done by soaking and/or steaming and can also include mixing, heating, and adding flavorings. After hydration and tempering, the beans can be divided into two portions. One portion can be composed of beans that are to remain whole and the second portion can be composed of beans that are destined to be milled into puree. The beans destined to be milled are milled and then both the hydrated whole beans and puree can be cooked together or separately at desired and controlled temperatures and pressures. The moisture content of the beans is carefully controlled to ensure that the desired hydration, consistency, and cooking is obtained.

In processing instant/dried refried beans, extruders have been utilized to temper, cook, dehydrate, and crush beans, sometimes utilizing one machine. By combining a number of steps into one machine, the processing time was decreased along with labor. Because the beans do not have to be pumped into and reheated in different machines, the beans are cooked and crushed faster, and only one machine needs to be cleaned. The amount of water and pressure within the extruder must be strictly controlled to optimize dehydration. Under these strict conditions, bean dough is produced for utilization in the production of instant/dried bean products.

Extruders have been utilized for processing dried/instant refried bean products for over ten years without being utilized for processing at least partially hydrated refried bean products. A partially hydrated bean product, including partially hydrated and cooked bean products, is partially to fully hydrated. One example of a partially hydrated bean product of the disclosure is a partially hydrated bean paste. As used herein, a partially hydrated bean product is not a bean dough or an instant/dried bean product. A partially hydrated bean product of the disclosure, including but not limited to a partially hydrated bean paste, comprises a water content of about 40% to about 95% inclusive by weight. In some of the partially hydrated bean products of the disclosure, the product comprises about 40% to about 45% inclusive; about 40% to about 50% inclusive; about 40% to about 55% inclusive; about 40% to about 60% inclusive; about 40% to about 65% inclusive; about 40% to about 70% inclusive; about 40% to about 75% inclusive; about 40% to about 80% inclusive; about 45% to about 85% inclusive; about 45% to about 50% inclusive; about 45% to about 55% inclusive; about 45% to about 60% inclusive; about 45% to about 65% inclusive; about 45% to about 70% inclusive; about 45% to about 75% inclusive; about 45% to about 80% inclusive; about 50% to about 85% inclusive; about 45% to about 90% inclusive; about 45% to about 95% inclusive; about 50% to about 55% inclusive; about 50% to about 60% inclusive; about 50% to about 65% inclusive; about 50% to about 70% inclusive; about 50% to about 75% inclusive; about 50% to about 80% inclusive; about 55% to about 85% inclusive; about 55% to about 60% inclusive; about 55% to about 65% inclusive; about 55% to about 70% inclusive; about 55% to about 75% inclusive; about 55% to about 80% inclusive; about 60% to about 85% inclusive; about 60% to about 90% inclusive; about 60% to about 95% inclusive; about 60% to about 65% inclusive; about 60% to about 70% inclusive; about 60% to about 75% inclusive; about 60% to about 80% inclusive; about 65% to about 85% inclusive; about 60% to about 75% inclusive; about 60% to about 80% inclusive; about 65% to about 85% inclusive; about 65% to about 70% inclusive; about 65% to about 75% inclusive; about 65% to about 80% inclusive; about 70% to about 85% inclusive; about 70% to about 75% inclusive; about 70% to about 80% inclusive; about 75% to about 85% inclusive; about 75% to 80% inclusive; and about 80% to about 85% inclusive by weight. The partially hydrated bean products can be in paste form, such as a partially hydrated bean paste. The partially hydrated bean paste can be processed to produce canned refried beans, aseptic refried beans, frozen refried beans, and beans that are ready for consumption directly after processing.

Referring generally to FIGS. 1 through 5, an extruder 100 for efficiently producing at least partially hydrated and cooked bean products by hydrating, cooking, and extruding beans is shown. The extruder 100 is capable of processing any variety of bean. The term "bean" as used herein comprises beans, peas, and lentils. Examples of beans include, but are not limited to, faba beans, azuki beans, mung beans, snap peas, sugar peas, black-eyed peas, chickpeas, lima beans, soybeans, navy beans, kidney beans, pinto beans, black beans, red beans, garbanzo beans, great northern beans, small red beans, pink beans, and the like. This list is not restrictive. It is understood that any edible bean may be processed by the extruder 100 without departing from the scope and intent of the disclosure. A variety of beans can be utilized for the creation of the partially hydrated refried bean products including pinto beans, kidney beans, great northern beans, small red beans, pink beans, black beans, navy beans, faba beans, garbanzo beans, and the like. This list is not restrictive. It is understood that other beans suitable for making partially hydrated refried bean products can be utilized without departing from the scope and intent of the disclosure.

By combining the steps of hydrating, cooking, and extruding into one machine, the processing time for producing at least partially hydrated bean products is decreased along with labor because the beans do not have to be pumped into and reheated in different machines, because the beans are cooked and crushed faster, and because only one machine has to be cleaned. Further the method for producing the at least partially hydrated bean products, such as an at least partially hydrated and cooked bean product, can be a continuous process. Therefore, the utilization of one extruder for hydrating, cooking, and extruding beans is a more efficient production method for producing the partially hydrated bean products of the disclosure.

The extruder 100 can include a barrel 102 having an inlet 104 and apertured peripheral extrusion die 106 across the barrel outlet 108, as illustrated in FIGS. 1 through 5. The extruder 100 is discussed in relation to bean products. This is not restrictive. The extruder 100 may also be utilized for producing an at least partially hydrated and cooked bean products. The size of the die 106 can be adjusted as desired. An elongated flighted axially rotatable screw assembly 110 is located within the barrel 102 lengthwise. Each screw of the screw assembly 110 rotates about an axis oriented longitudinally within the barrel 102. An electric motor can be utilized to rotate the screw assembly 110. In some examples of the disclosure, the extruder has a flow rate of about 20 kg/hr to about 3000 kg/hr. In some examples of the disclosure, the extruder has a flow rate of about 1000 kg/hr to about 3000 kg/hr. In some examples of the disclosure, the extruder has a flow rate of about 1000 kg/hr to about 2000 kg/hr.

Figure 1:
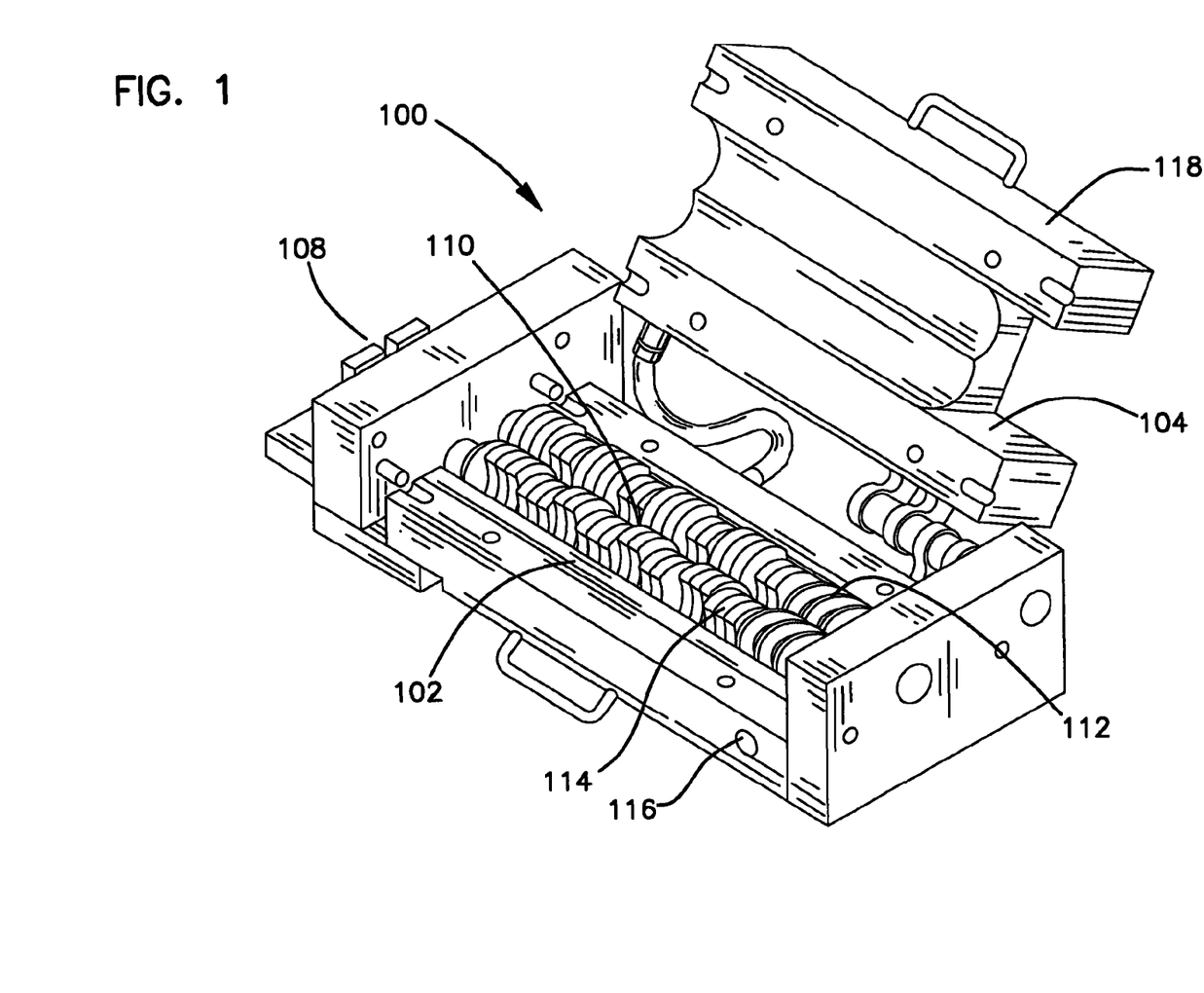
FIG. 1 is an isometric view illustrating a extruder.
Figure 5:
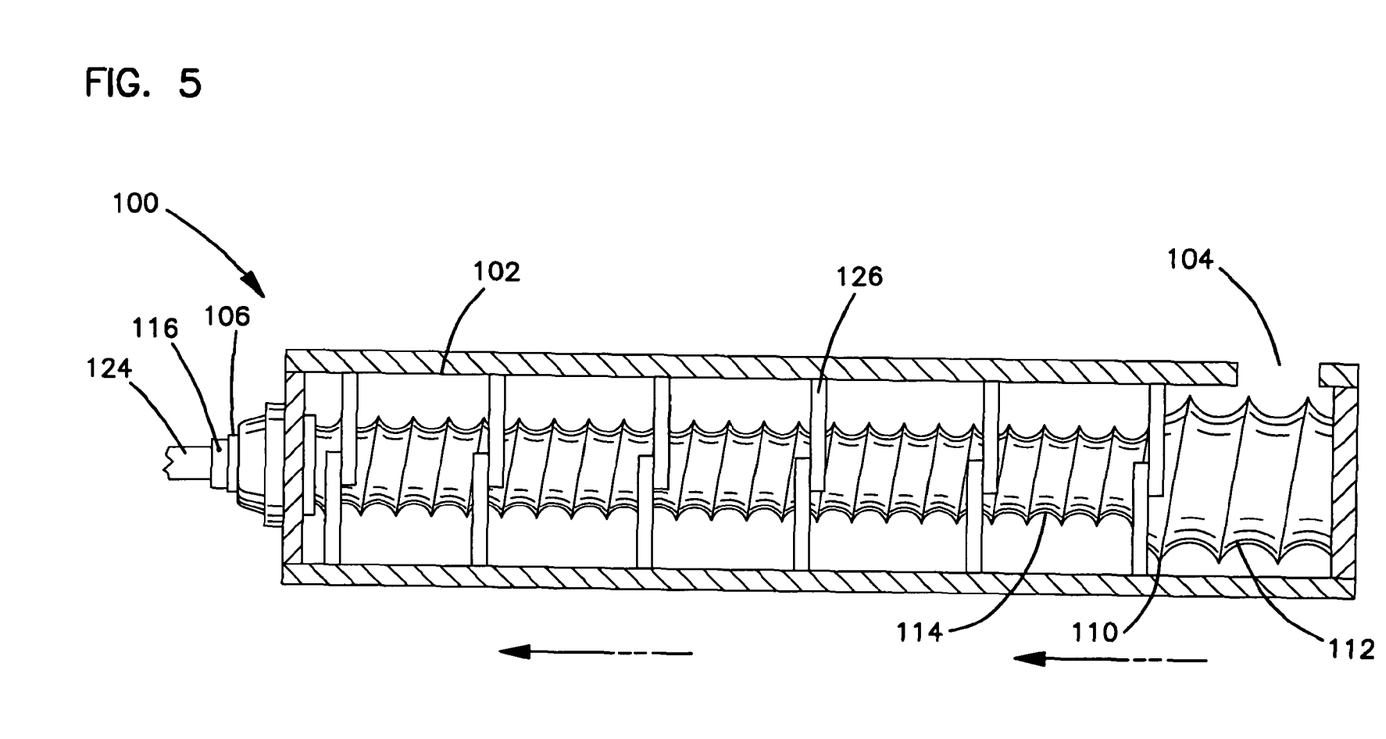
FIG. 5 is a partial cross-sectional side view of the extruder illustrated in FIG. 4.

The screw assembly 110 includes at least one screw section. The screw assembly can comprise one or more screws. FIG. 1 shows an exemplary twin screw assembly configuration. The screw assembly 110 can include an inlet screw section 112 and second screw section 114. The pitch or pitches of the screw assembly may vary depending upon the desired end product. The screw assembly can have a pitch of 2 mm, 1.8 mm 1.6 mm, 1.5 mm, 1.4 mm, 1.2 mm, 1 mm, 0.9 mm, 0.8 mm, 0.7 mm, 0.6 mm, 0.5 mm, 0.4 mm, 0.3 mm, 0.2 mm, 0.1 mm, or a combination thereof. The inlet screw section 112 can have a pitch of 1 mm, the second screw section 114 can have a pitch of ¾ mm. A third screw section can be present with a pitch of ½ mm. This list is not restrictive. It is contemplated that different sized pitches and different numbers of screw sections for producing a partially hydrated refried bean product can be utilized without departing from the scope and spirit of the disclosure. A sheer lock 126 can be found within a screw section or a sheer lock 126 can divide differing screw sections as illustrated in FIG. 5. It is contemplated that the screw assembly 110 can include zero to about 15 sheer locks depending upon the desired consistency of the at least partially hydrated bean product. If the die 106 is small enough, the screw assembly 110 can have no sheer locks.

Figure 4:
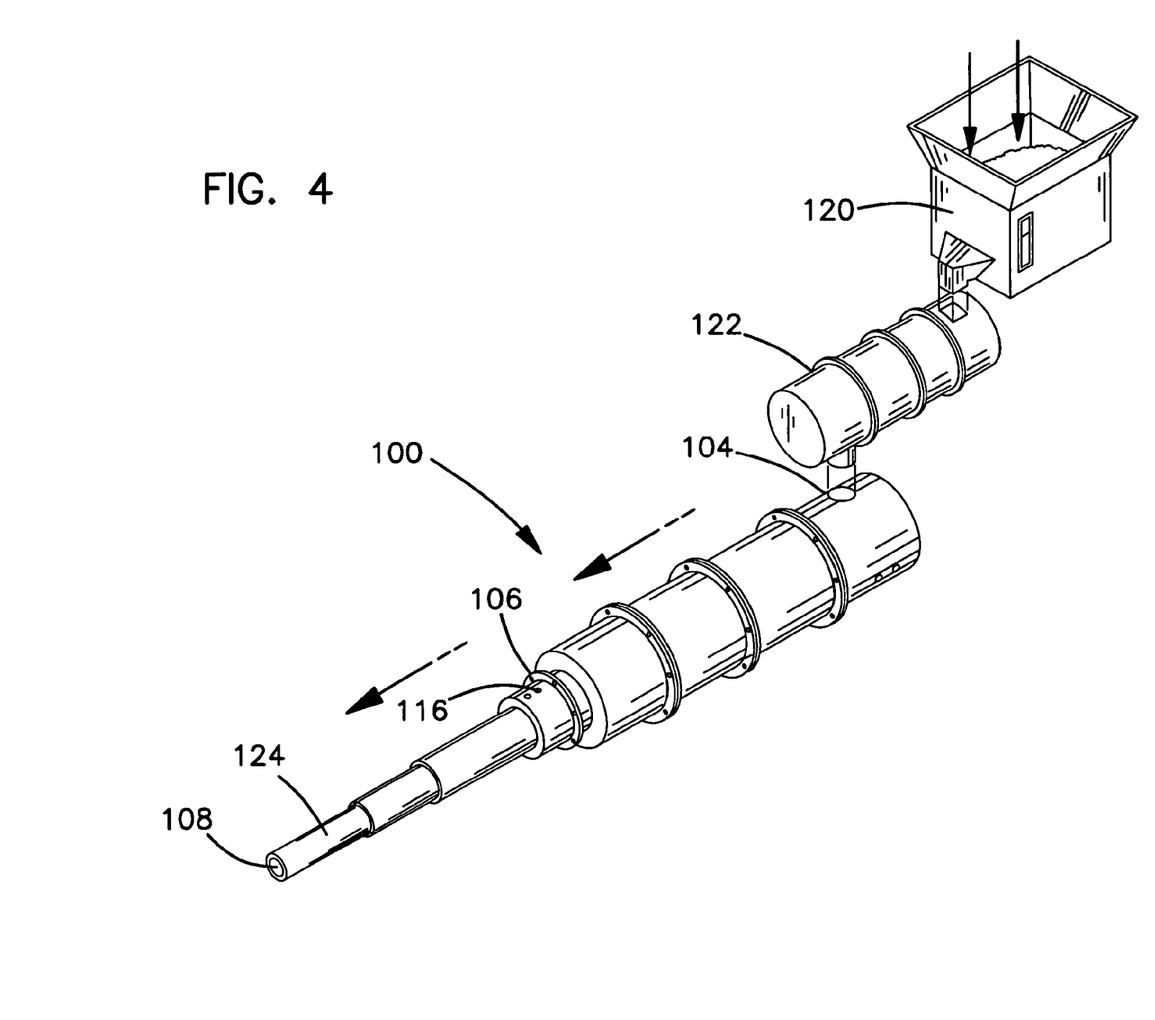
FIG. 4 is an isometric view of a extruder.

A preconditioner 122 can be located above the inlet 104 with the preconditioner's outlet attached to the inlet 104 of the extruder 100, as illustrated in FIG. 4. A feeder 120 can be utilized to add the beans to the extruder 100 and/or preconditioner 122. Additional inlets for whole cooked beans and other flavorings can be strategically placed along the extruder 100. An inlet can be placed just past the extruder 100 to allow whole cook beans to be added to the bean paste.

Figure 2:
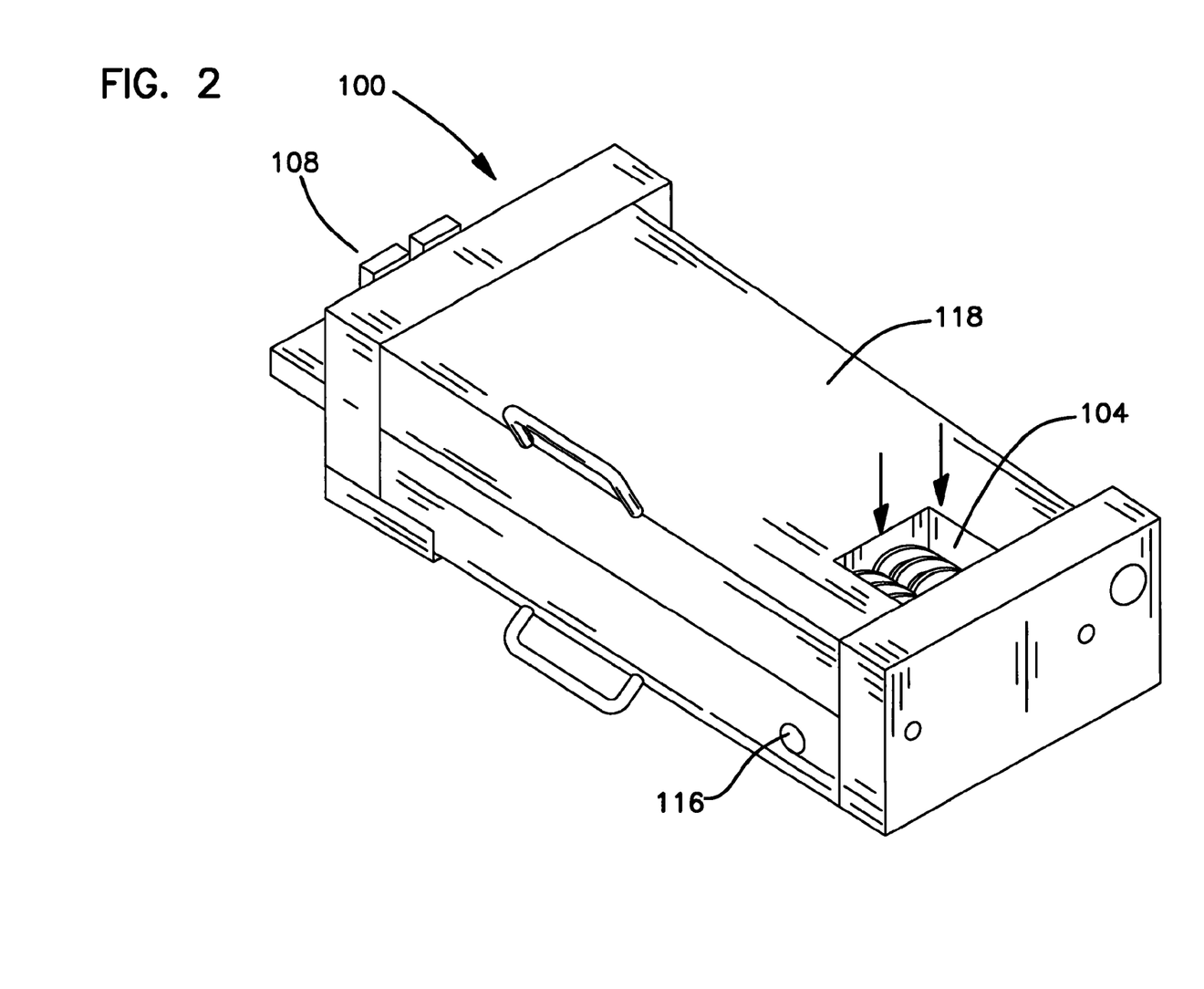
FIG. 2 is an isometric view of the extruder as illustrated in FIG. 1.
Figure 3:
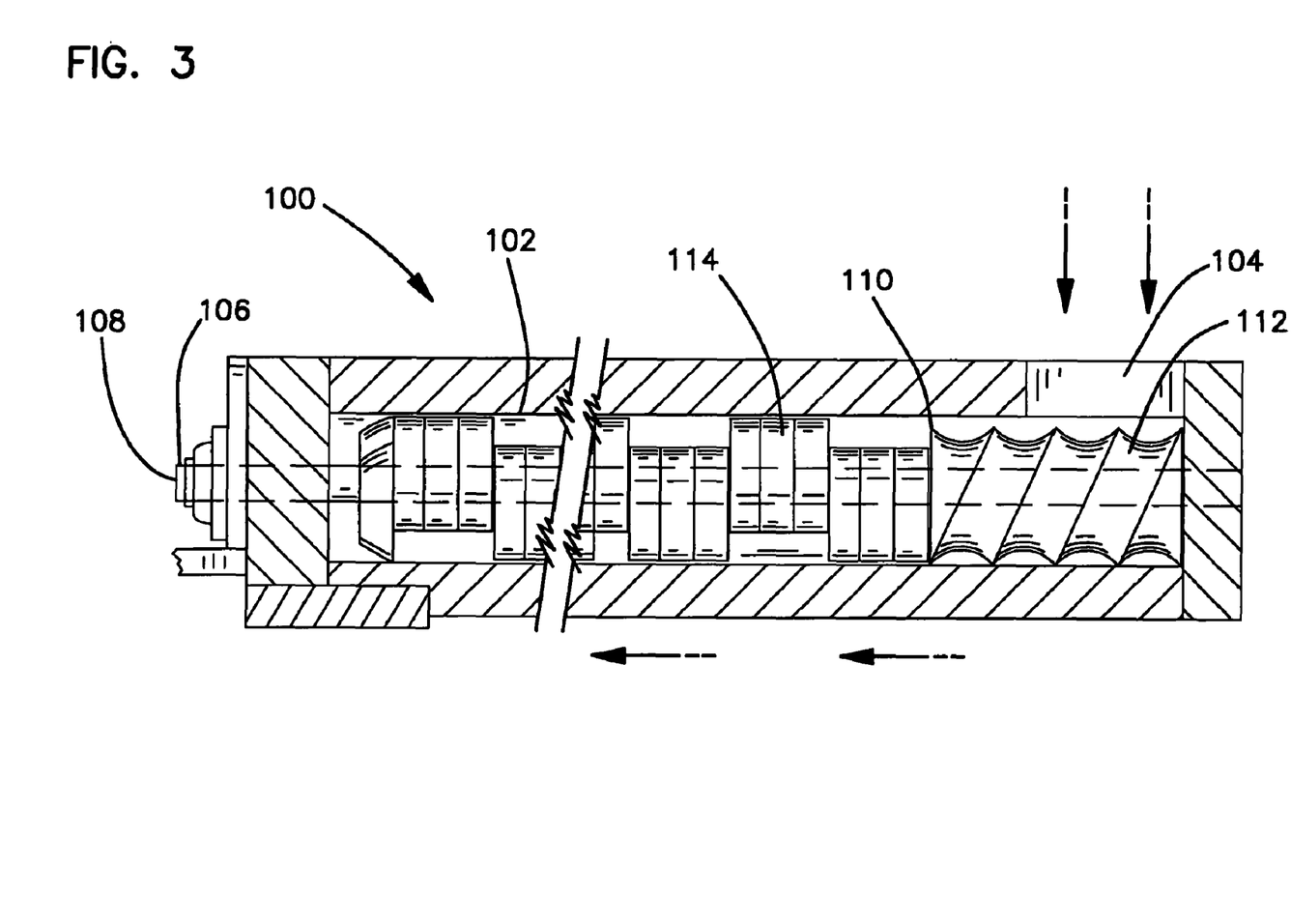
FIG. 3 is a cross-sectional side view of the extruder illustrated in FIG. 2.

The barrel 102 can be a temperature and pressure controlled chamber. A cover 118 can be attached to the barrel 102 by a hinge, as illustrated in FIGS. 1 through 3. The cover can fold down over and seal the barrel 102 to create a temperature and pressure controlled chamber in the barrel 102. The extruder 100 can have no cover and instead can be sections bolted together, as illustrated in FIGS. 4 and 5.

Inlet and outlet heads 116 on the extruder 100 can permit the introduction of heat and cooling media, such as hot water, cold water, and steam, as illustrated in FIGS. 1 through 5. Heads 116 can be located near the inlet 104 and near the die 106. The extruder 100 can include an extended tube 124, as illustrated in FIG. 4. It is contemplated that other screw extruders capable of hydrating, cooking, and extruding beans can be utilized without departing from the scope and spirit of the disclosure.

Figure 8:
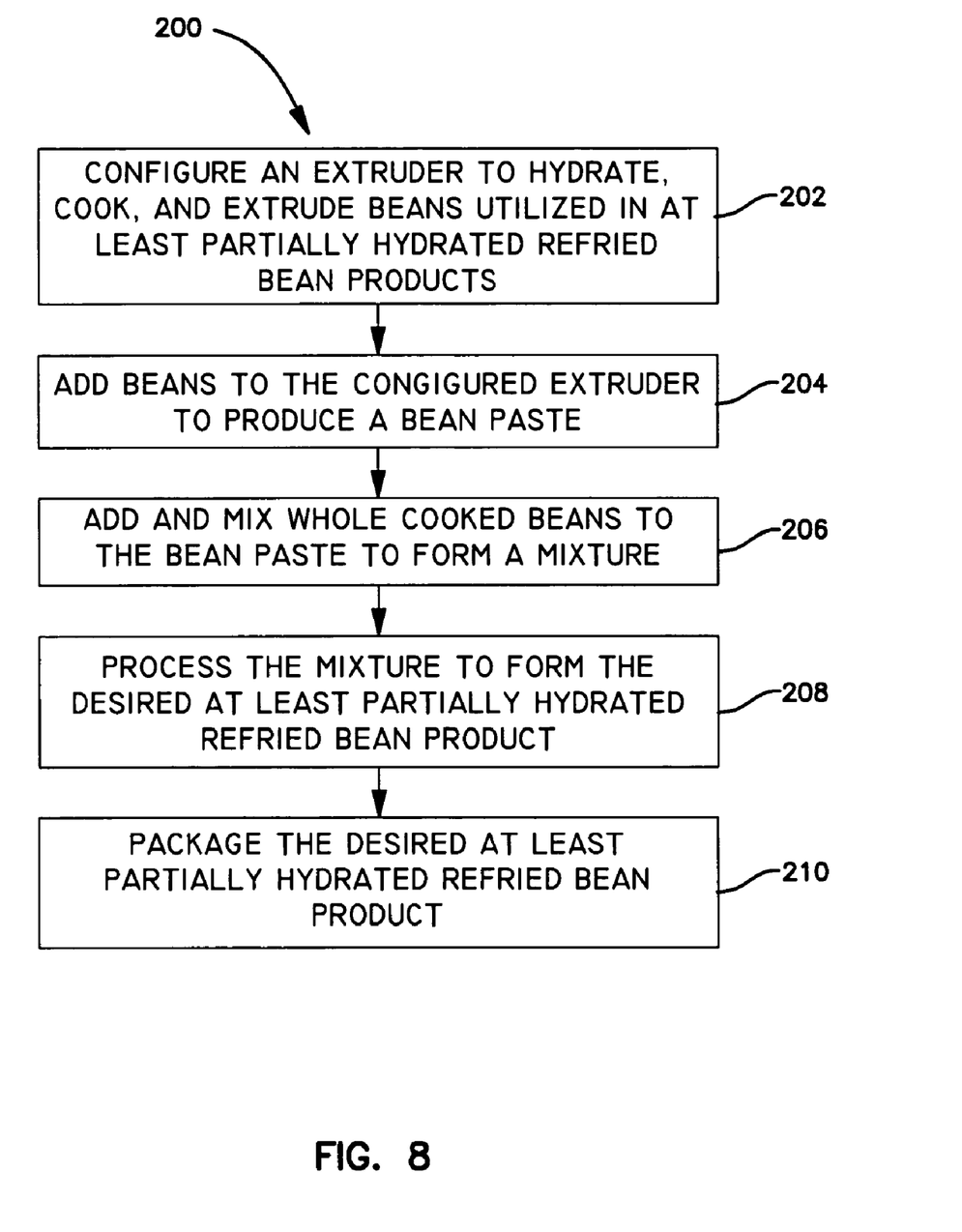
FIG. 8 is a block diagram illustrating a method for processing refried beans.

Referring generally to FIG. 8 a method for processing at least partially hydrated refried beans 200 is shown. Beans are added to an extruder 204. The beans can be in whole or spilt form. As used herein, split beans mean beans that are not whole. Split beans can be, for example, cut, split, quartered, crushed, fractioned, particles, chunked, and the like. The beans can be preconditioned. The extruder is configured to hydrate, cook, and extrude beans 202. The extruder produces a bean paste 204. Whole cooked beans and/or split cooked beans can be added and mixed with the bean paste outside of the extruder to form a mixture 206. Whole cooked beans can be added and mixed with bean paste inside of the extruder to form a mixture 206. The bean paste and/or the bean paste and whole cooked bean mixture can be further hydrated to contain a water content of between about 60% to about 95% inclusive water by weight. The mixture is further processed as desired 208. Further processing can include checking the mixture's conductivity and/or pH, as well as adding a spice slurry. Secondary ingredients and other flavorings can be added throughout processing, such as spices, vinegar, fats or oils, and other suitable bean ingredients. In some of the examples of the disclosure, the pH of the partially hydrated bean paste is adjusted to a pH of about 4 to about 8 with a corresponding conductivity. The further processed at least partially hydrated refried bean product is packaged 210. The desired at least partially hydrated refried bean product can be packaged in a can and sterilized after sealing with heat or steam.

Referring generally to FIGS. 1 through 5 and 9 a method of producing at least partially hydrated refried bean products 300 is shown. The method 300 illustrated in FIG. 9 can be executed by the extruders of FIGS. 1 through 5. The method 300 is discussed in relation to beans; however, this is not restrictive. Method 300 may also be applied to the processing of at least partially hydrated and cooked bean products. Beans can be added to the extruder 100 through the inlet 104 with or without preconditioning. The beans can be added to the preconditioner 122 and/or extruder 100 by a feeder 120, as illustrated in FIG. 4. The beans can be split prior to being added to the extruder 100 and/or the preconditioner 122 and can be added separately or with whole beans. Typically beans without preconditioning have a water content of about 8% to about 18% inclusive by weight.

Figure 9:
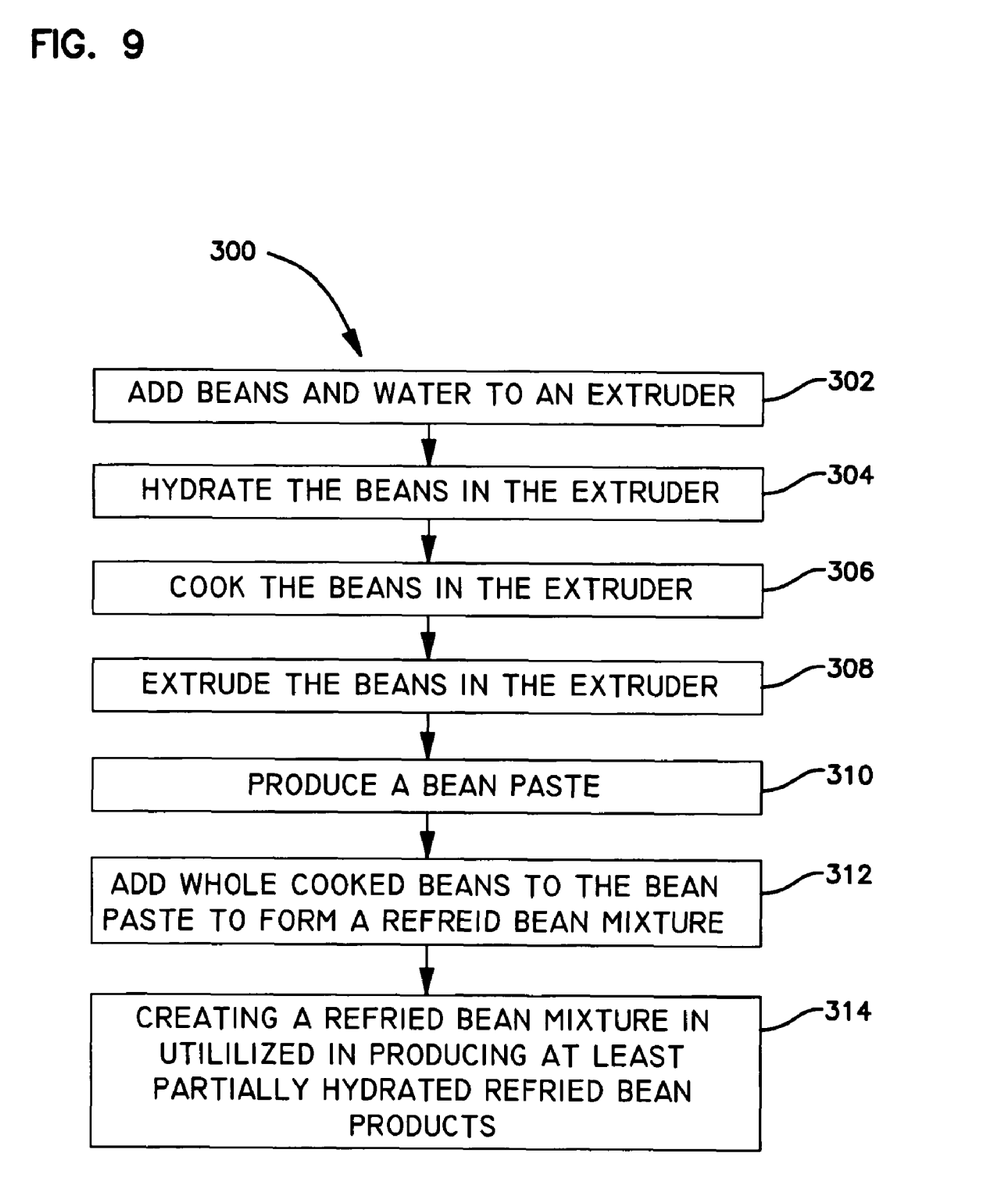
FIG. 9 is a block diagram illustrating a method for producing refried bean products.

Water is added with the beans 302 while the screw assembly 110 is being rotated for hydration. In some examples of the disclosure, water is added at a feed rate of about 5 kg/hr to about 50 kg/hr, about 10 kg/hr to about 50 kg/hr, about 15 kg/hr to about 50 kg/hr, or about 20 kg/hr to about 50 kg/hr. The inlet screw section 112 rotates the added beans and water, tempering and hydrating the beans 304. As the inlet screw section 112 rotates and hydrates the beans, the inlet screw section 112 also compresses the beans and pushes them into the next screw section, such as the second screw section 114, or through the die 106 if no other screw sections are present. The screw assembly may comprise 1, 2, 3, 4, 5, 6, or 7 screw sections. This list is not restrictive. It is appreciated that any suitable number of screw sections may be utilized for extruding beans without departing from the scope and intent of the disclosure. As the beans travel through the screw section the beans can also travel through a sheer lock 126, which mashes the beans and can create additional pressure within the barrel 102. Water/steam travels through the screw sections and/or sheer locks 126 with the beans and gradually can decrease in temperature creating different temperature zones across the screw assembly 110. The screw assembly 110 can comprise two different, three different, four different, five different, six different temperature, or seven different temperature zones can exist in the screw assembly. This list is not restrictive. It is understood that any suitable number of temperatures zones for extruding a bean may be utilized without departing from the scope and intent of the present invention.

The temperature zones can have a temperature of about 60° C. to about 125° C. inclusive. In some examples of the disclosure, the one or more of the temperature zones can have a temperature of about 60° C. to about 110° C. A first temperature zone of the screw assembly 110 may have a temperature between about 60° C. to about 85° C. inclusive. A second temperature zone of the screw assembly 110 may have a temperature of about 100° C. to about 125° C. inclusive. A third temperature zone of the screw assembly 110 may have a temperature of about 60° C. to about 110° C. inclusive. A fourth temperature zone of the screw assembly 110 may have a temperature of about 60° C. to about 110° C. inclusive. A fifth temperature zone of the screw assembly 110 may have a temperature of about 60° C. to about 110° C. inclusive. A sixth temperature zone of the screw assembly 110 may have a temperature of about 60° C. to about 110° C. inclusive. The temperature can be controlled by changing the original temperature of the water/steam as the water/steam is added into the screw assembly 110 or by adding additional temperature controlled water/steam in to the screw assembly 110 for the desired cooking and hydration of the selected at least partially hydrated bean product.

In the second screw section 114 or any other downstream screw section, the temperature controlled water and/or steam and/or pressure can be utilized to cook and further hydrate the beans as the screw section further compresses the beans 306. The second screw section 114 or the last screw section of the screw assembly 110 pushes the cooked hydrated beans through a die 106 to extrude the beans 308. The screw assembly may utilize a pressure of about 50 psi to about 500 psi inclusive depending upon the screw section, the number of screw sections, temperature zones, and desired end product. The first section may have a pressure of about 50 psi to about 150 psi. The second screw section may have a pressure of about 50 psi to about 150 psi. The third screw section may have a pressure of about 50 psi to about 150 psi. The fourth screw section may have a pressure of about 50 psi to about 150 psi. The fifth screw section may have a pressure of about 50 psi to about 150 psi.

Typically, the extrusion die 106 has an opening that allows the pressure necessary to force the beans through the die 106 to be approximately equal to or greater than the vapor pressure of the steam at the product temperature generated inside the extruder 100. The size of the die can be adjusted for different desired consistencies. The extruder 100 can include an extended tube 124 past the die 106 for providing the bean paste with extra hydration and cooking. A head 116 can be present in the extended tube 124 that provides additional water/steam for the extended cooking and hydration of the bean paste, as illustrated in FIG. 4. A bean paste is formed after extrusion 310 and after traveling through the extended tube 124. The resulting bean paste can have a water content of about 35% to about 85% inclusive by weight, unlike the product of an extruder that is utilized to form instant/dried refried bean products, which produce bean dough.

Figure 6:
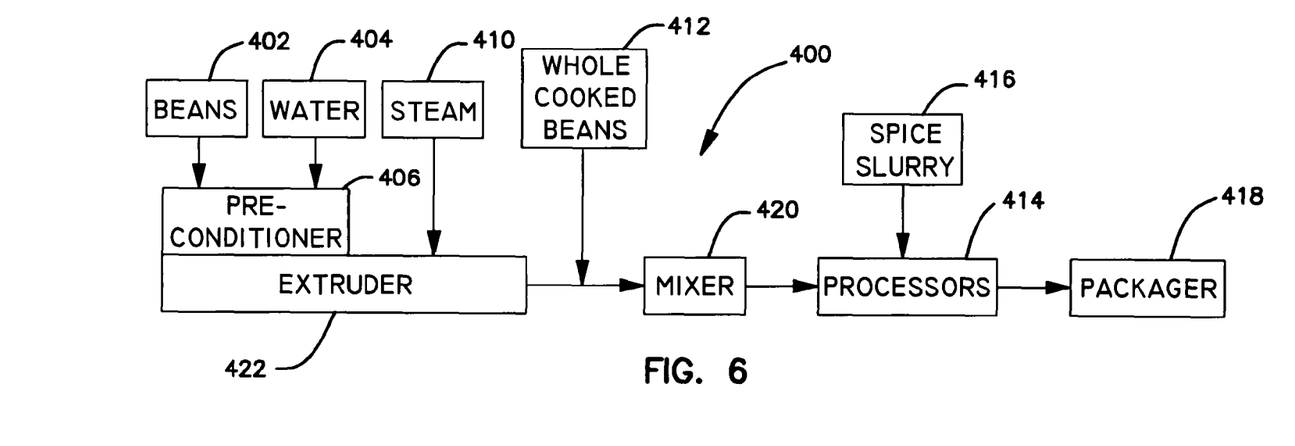
FIG. 6 is a flow diagram illustrating a system for processing refried bean products.
Figure 7:
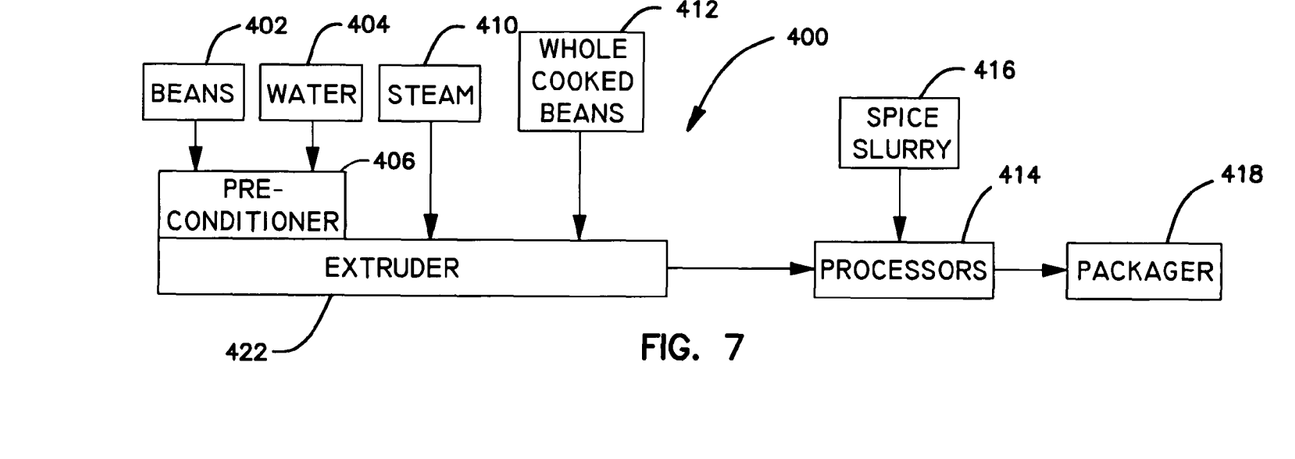
FIG. 7 is a flow diagram illustrating a system for processing refried bean products, wherein whole cooked beans are added and mixed in the extruder.

The partially hydrated bean paste can exit the extruder 100 and whole cooked beans are added and mixed with the bean paste by a mixer as illustrated in FIG. 6. Whole cooked beans can be added and mixed with the bean paste inside the extruder 100, as illustrated in FIG. 7. The mixture then exits the extruder 100. The mixtures formed from either method are further processed to form at least partially hydrated refried bean products. The extruder 100 can add and mix water with the whole cooked beans for further hydration and cooking. Water can be added and mixed with the bean paste after the bean paste exits the extruder 100 for further hydration.

Figure 10:
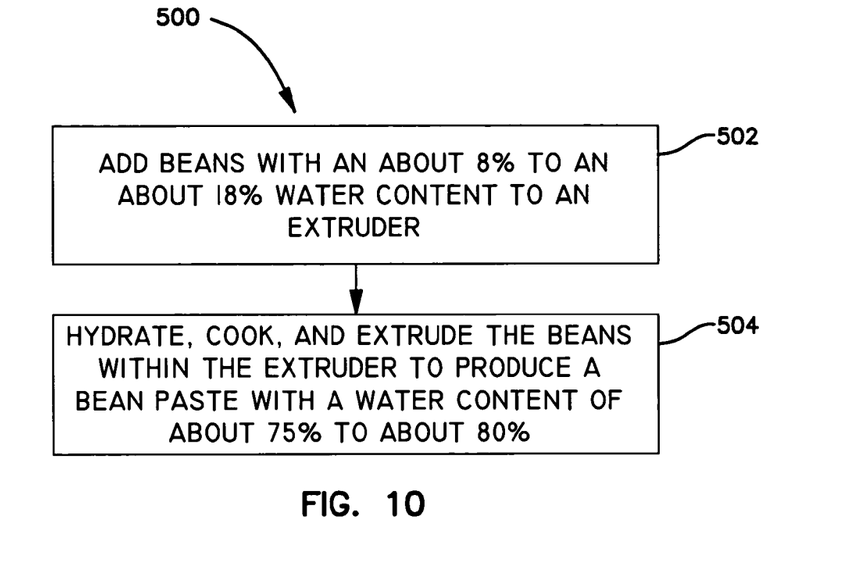
FIG. 10 is a block diagram illustrating a method of extrusion.
Figure 11:
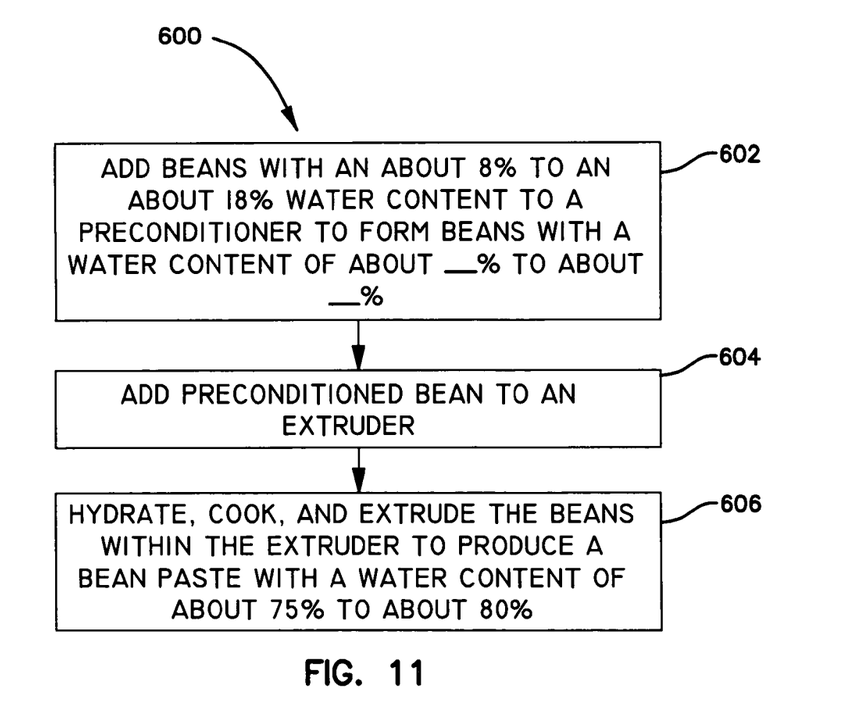
FIG. 11 is a block diagram illustrating a method of extrusion, wherein a preconditioner is utilized.

Referring generally to FIG. 10 a method of extrusion 500 is shown. Beans with a moisture content of about 8% to about 18% inclusive by weight, as typically found in nature, are added to an extruder 502. The method 500 is discussed in relation to beans; however, this is not restrictive. The extruder hydrates, cooks, and extrudes the beans to form a bean paste with a water content of about 40% to about 95% inclusive by weight 504. Referring generally to FIG. 11 a method of extrusion 600 is shown. Beans with a moisture content of about 8% to about 18% inclusive by weight, as typically found in nature, can be added to a preconditioner to form beans with a water content of about 25% to about 40% inclusive by weight 602. The preconditioned beans are added to an extruder 604. The extruder hydrates, cooks, and extrudes the beans to form a bean paste with a water content of about 75% to about 95% inclusive by weight 606.

Referring generally to FIGS. 6 and 7 the system for processing beans 400 in the formation of at least partially hydrated refried bean products is shown. The system 400 is discussed in relation to beans; however, this is not restrictive.

Beans 402 and water 404 can be added to a preconditioner 406 and preconditioned before being pumped into the extruder 422. The beans 402 and water 404 can be added directly to the extruder 422. Steam 410 is added to the extruder 422 to cook and hydrate the beans 402. In some examples of the disclosure, steam is added a feed rate of about 5 kg/hr to about 50 kg/hr, about 10 kg/hr to about 50 kg/hr, about 15 kg/hr to about 50 kg/hr, or about 20 kg/hr to about 50 kg/hr. In some examples of the disclosure, the steam is added at about 50 psi to about 150 psi.

The beans can exit the extruder 422 in the form of bean paste before whole cooked beans 412 are added to the bean paste and the whole cooked beans 412 and bean paste are pumped into a mixer 420 and mixed, as illustrated in FIG. 6. Whole cooked beans 412 can be split cooked beans or a mixture of whole and split cooked beans. The whole cooked beans and/or split cooked beans 412 can be added and mixed with the bean paste within the extruder 422, as illustrated in FIG. 7.

The mixtures from either method are pumped to other machines for further processing 414. The type of processing varies depending upon the desired at least partially hydrated refried bean product. The further processing is different for canned beans than the processing is for frozen bean products. During processing a spice slurry 416 can be added to the bean paste and whole bean mixture.

Water 404 can be added to the bean paste for further hydration prior to adding the whole cooked beans 412. Water/steam can be added to the bean paste and/or bean paste and whole cooked bean mixture for further hydration. The desired at least partially hydrated refried bean product is sealed in a container and sterilized by utilizing steam and/or heat 418. It is contemplated that other packaging means that are sterile and capable of storing the at least partially hydrated refried bean product at room temperatures and/or freezing temperatures can be utilized without departing from the scope and intent of the disclosure. Alternatively, the at least partially hydrated refried bean product can be consumed directly after processing and not packaged.

The following steps can be performed to produce a partially hydrated bean paste, which could be utilized to provide a partially hydrated and cooked bean product. The flow rates and feeds rates of the process are dependent upon the scale of the process and can adjusted upwards or downwards to account for the scale of the process.

About 65 kg/hr to about 80 kg/hr inclusive of beans having a water content of about 8% to about 18% inclusive by weight can be preconditioned in a preconditioner with about 18 kg/hr to about 30 kg/hr inclusive of steam at about 60 psi to about 80 psi inclusive and about 20 kg/hr to about 32 kg/hr inclusive of water for about 0.2 minutes to about 2 minutes inclusive. In some examples of the disclosure, the preconditioner has a flow rate of about 20 kg/hr to about 3000 kg/hr. In some examples of the disclosure, the preconditioner has a flow rate of about 1000 kg/hr to about 3000 kg/hr. In some examples of the disclosure, the preconditioner has a flow rate of about 1000 kg/hr to about 2000 kg/hr. The beans can have a dry recipe density of about 650 kg/m$^3$ to about 740 kg/m$^3$ inclusive. The preconditioner can be operated at a speed of about 80 RPMs to about 140 RPMs inclusive while processing the beans. The preconditioned beans, at a temperature of about 160° F. to about 200° F. inclusive, can be fed into an extruder comprising a screw assembly. The extruder can be a screw extruder.

In the extruder, the beans can be hydrated with about 5 kg/hr to about 20 kg/hr inclusive of steam at about 50 psi to about 90 psi inclusive for about 0.5 minutes to about 3.5 minutes inclusive. The beans are cooked in the extruder by steam/hot water resulting in five different temperature zones within the extruder. Longitudinally through the extruder, the temperature of zone one can be about 70° C. to about 78° C. inclusive, zone two can be about 105° C. to about 115° C. inclusive, zone three can be about 95° C. to about 105° C. inclusive, zone four can be about 95° C. to about 105° C. inclusive, and zone five can be about 95° C. to about 105° C. inclusive. As the beans progress through the extruder the steam can be added at about 10 kg/hr to about 16 kg/hr inclusive with about 14 kg/hr to about 20 kg/hr inclusive of water for about 40 seconds to about 50 seconds inclusive as the beans are compressed by the rotating screws or screws. In some examples of the disclosure, screw or screw assembly can be rotated at about 320 RPMs to about 380 RPMs inclusive by a motor.

After cooking, the beans are forced through a 0.465 diameter adjustable die opened to about 0.015 inches to about 0.460 inches inclusive at a rate of about 145 kg/hr to about 165 kg/hr inclusive with about 100 psi to about 500 psi inclusive within the extruder. The barrel of the extruder can be about 80 inches to about 200 inches inclusive long. Additional water was added to the product at about 30 kg/hr to about 50 kg/hr inclusive as the product is pushed through an extended tube about 95 inches to about 115 inches inclusive long with a diameter of about 0.5 inches to about 3.5 inches inclusive after being forced through the adjustable die to produce a bean paste. The bean paste can have a water content of about 40% to about 95% inclusive by weight. The beans can be processed by mixing the beans with secondary ingredients and other flavorings, such as spices, vinegar, fats or oils, and other suitable bean ingredients, and then canned and sterilized at about 242° F. about 270° F. inclusive for about 30 minutes to about 90 minutes inclusive after sealing.

EXAMPLE 1

The following steps were performed to produce partially hydrated bean paste, which could be utilized to provide canned refried beans.

73 kg/hr of pinto beans having a water content of about 13% by weight were preconditioned in a preconditioner with 25.2 kg/hr of steam at about 70 psi and 26.3 kg/hr of water for about 1 minute. The pinto beans had a dry recipe density of about 690 kg/m³. The preconditioner operated at a speed of about 110 RPM while processing the pinto beans. The preconditioned pinto beans, at a temperature of about 175° F. to about 185° F. inclusive, were fed into a twin screw extruder. In the extruder, the pinto beans were hydrated with about 11 kg/hr to about 14 kg/hr inclusive of steam at 70 psi for about 2 minutes. The pinto beans were cooked by the twin screw extruder by steam/hot water resulting in five different temperature zones within the extruder. Longitudinally through the twin screw extruder, the temperature of zone one was 74° C., zone two was 110° C., zone three was 100° C., zone four was 100° C., and zone five was 100° C. As the pinto beans progressed through the extruder the steam was added at about 13.9 kg/hr with about 17.8 kg/hr of water for about 45 seconds as the pinto beans were compressed by the rotating twin screws. The twin screws were rotated at about 350 RPM by the motor. After cooking, the pinto beans were forced through a 0.465 diameter adjustable die opened to about 0.035 inches to about 0.080 inches inclusive at a rate of about 156 kg/hr with about 100 psi to about 500 psi inclusive within the twin screw extruder. The barrel of the extruder was about 153 inches long. Additional water was added to the product at about 42 kg/hr as the product was pushed through an extended tube about 105 inches long with a diameter of 2 inches after being forced through the adjustable die to produce a bean paste. The bean paste had a water content of about 75% to about 85% inclusive by weight. The beans in this example were processed by mixing the beans with spices, vinegar, and oil and then canned and sterilized at 252° F. for about 75 minutes after sealing.

The resulting at least partially hydrated refried bean product or canned refried beans had a similar consistency and taste to canned refried beans made by conventional methods. Moreover, the processing time took a few minutes unlike normal processing methods, which can take up to 8 hours or more. Therefore, this system and/or method of production is more efficient than traditional processing means.

EXAMPLE 2

The following is a preparation of bean paste similar to the preparation the bean paste from Example 1, however, in this example, the pinto beans had a dry recipe density of about 680 kg/m³ to about 710 kg/m³ inclusive. Additionally, the steam utilized in this example flowed into the preconditioner at about 23 kg/hr to about 36 kg/hr inclusive. Further, the preconditioned beans, at about 120° F. to about 135° F. inclusive, were fed into the extruder and steam was added to the extruder at about 10.5 kg/hr to about 11.5 kg/hr inclusive.

The methods disclosed can be implemented as sets of instructions, through a single machine, and/or through multiple machines. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the disclosure. The accompanying method claims present elements of the various steps in a sample order, and are not necessarily meant to be limited to the specific order or hierarchy presented.

It is believed that the disclosure and many of its attendant advantages will be understood by the foregoing description, and it will be apparent that various changes can be made in the form, construction and arrangement of the components thereof without departing from the scope and spirit of the disclosure or without sacrificing all of its material advantages. The form herein before described being merely explanatory, it is the intention of the following claims to encompass and include such changes.

What is claimed is:

1. A method for producing a partially hydrated bean product, comprising:
  inputting a quantity of uncooked beans into an extruder, the uncooked beans being in a whole bean form or a split bean form, wherein the extruder comprises: an inlet, one or more temperature zones in series downstream of the inlet, a die downstream of the one or more temperature zones; and an extended tube downstream of the die, the extended tube being connected to an outlet of the extruder, the extended tube including an input for adding at least one of: steam and water;
  rotating a screw assembly of the extruder to extrude the beans and force the beans through the one or more temperature zones, wherein a quantity of steam and/or a quantity of water is added to the beans as the beans are forced through the temperature zone;
  forcing the beans exiting the final temperature zone of said one or more temperature zones in series through the die to produce a bean paste;

directing the bean paste through the extended tube and adding an additional quantity of at least one of: steam and water to the bean paste within the extended tube for producing a partially hydrated bean paste; and directing the partially hydrated bean paste from the extended tube of the extruder to the outlet of the extruder for causing the partially hydrated bean paste to exit the extruder via the outlet, wherein the partially hydrated bean paste, upon exiting the extruder via the outlet, comprises a water content of at least 55% to about 95% inclusive by weight.

2. The method of claim 1, wherein the method for producing the partially hydrated bean product is a continuous process.

3. The method of claim 1, wherein the beans comprise beans, peas, and lentils, or a mixture thereof.

4. The method of claim 1, wherein the beans comprise pinto beans.

5. The method of claim 1, wherein the flow rate of the extruder comprises about 1000 kg/hr to about 3000 kg/hr.

6. The method of claim 1, wherein the feed rate of the steam comprises about 20 kg/hr to about 50 kg/hr at about 50 psi to about 150 psi.

7. The method of claim 1, wherein the extruder comprises two temperature zones, three temperature zone, four temperature zone, five temperature zones, six temperature zones, or seven temperature zones.

8. The method of claim 1, wherein the extruder comprises at least three temperature zones.

9. The method of claim 8, wherein the first temperature zone comprises a temperature of about 60° C. to about 85° C., the second temperature zone comprises a temperature of about 100° C. to about 125° C., and the third temperature zone comprises a temperature of about 90° C. to about 110° C.

10. The method of claim 1, wherein the temperature of the temperature zone is controlled by increasing or decreasing the temperature of the quantity of water and/or steam added to the temperature zone.

11. The method of claim 1, wherein the temperature of the temperature zone is controlled by adding a second quantity of water and/or steam to the temperature zone, wherein the second quantity of water and/or steam has a higher temperature than the first quantity of steam and/or water.

12. The method of claim 1, wherein the temperature of the temperature zone is controlled by adding a second quantity of water and/or steam to the temperature zone, wherein the second quantity of water and/or steam has a lower temperature than the first quantity of steam and/or water.

13. The method of claim 1, wherein the uncooked beans comprise a water content of about 8% to about 18% inclusive by weight.

14. The method of claim 1, further comprising preconditioning the quantity of uncooked beans in a preconditioner upstream of the extruder.

15. The method of claim 14, wherein the preconditioned beans comprise a water content of about 25% to about 40% inclusive by weight.

16. The method of claim 14, wherein preconditioning comprises adding about 20 kg/hr to about 30 kg/hr inclusive of steam at about 65 psi to about 75 psi inclusive and about 20 kg/hr to about 30 kg/hr inclusive of water to produce the quantity of beans with a water content of about 25% to about 40% inclusive by weight at a temperature of about 170° F. to about 200° F. inclusive.

17. The method of claim 1, wherein the screw assembly is a twin screw assembly.

18. The method of claim 1, comprising rotating the screw assembly at about 200 RPMs to about 500 RPMs.

19. The method of claim 1, wherein the screw assembly comprises one or more screw sections.

20. The method of claim 1, wherein each temperature zone comprises a separate screw section.

21. The method of claim 1, wherein the screw assembly comprises at least three screw sections, the first screw section comprising a pitch of about 1 mm, the second screw section comprising a pitch of about ¾ mm, and the third screw section comprising a pitch of about ½ mm.

22. The method of claim 1, further comprising adding a quantity of cooked beans to the bean paste and mixing the cooked beans into the bean paste.

23. The method of claim 1, wherein the partially hydrated refried bean product comprises canned refried beans, ready for consumption refried beans, aseptic refried beans, or frozen refried beans.

24. The method of claim 1, further comprising processing the bean paste into refried beans, ready for consumption refried beans, aseptic refried beans, or frozen refried beans.

25. The method of claim 1, wherein the uncooked beans comprise a dry recipe density of about 600 kg/m$^3$ to about 800 kg/m$^3$.

26. A method of producing a partially hydrated bean paste, comprising:

inputting a quantity of uncooked beans at a feed rate of about 1000 kg/hr to about 3000 kg/hr into an extruder, the uncooked beans being in a whole bean form or a split bean form, wherein the extruder comprises: an inlet, three or more temperature zones in series downstream of the inlet, a die downstream of the three or more temperature zones; and an extended tube downstream of the die, the extended tube being connected to an outlet of the extruder, the extended tube including an input for adding at least one of: steam and water, wherein the uncooked beans comprise a water content of about 8% to about 18% by weight;

rotating a screw assembly of the extruder to extrude the beans and force the beans through at least a first temperature zone comprising a temperature of about 60° C. to about 110° C., wherein about 20 kg/hr to about 50 kg/hr of steam at about 50 psi to about 150 psi and/or about 20 kg/hr to about 50 kg/hr of water is added to the beans as the beans are forced through the first temperature zone;

rotating the screw assembly of the extruder to further extrude the beans and force the once partially hydrated beans through a second temperature zone comprising a temperature of about 100° C. to about 125° C., wherein about 20 kg/hr to about 50 kg/hr of steam at about 50 psi to about 150 psi and/or about 20 kg/hr to about 50 kg/hr of water is added to the beans as the beans are forced through the second temperature zone;

rotating a screw assembly of the extruder to further extrude the beans and force the twice partially hydrated beans through a third temperature zone comprising a temperature of about 90° C. to about 110° C., wherein about 20 kg/hr to about 50 kg/hr of steam at about 50 psi to about 150 psi and/or about 20 kg/hr to about 50 kg/hr of water is added to the extruded beans as the beans are forced through the third temperature zone;

forcing the partially hydrated beans exiting the final temperature zone of said three or more temperature zones in series through the die to produce a bean paste;

directing the bean paste through the extended tube and adding an additional quantity of at least one of: steam and water to the bean paste within the extended tube for producing a partially hydrated bean paste; and directing the partially hydrated bean paste from the extended tube of the extruder to the outlet of the extruder for causing the partially hydrated bean paste to exit the extruder via the outlet, wherein the partially hydrated bean paste, upon exiting the extruder via the outlet, comprises a water content of at least 70% to about 95% inclusive by weight.

* * * * *